United States Patent [19]

Dreschmann et al.

[11] Patent Number: 4,863,292
[45] Date of Patent: Sep. 5, 1989

[54] SEAL FOR ANTIFRICTION BEARINGS

[75] Inventors: Peter Dreschmann, Dittelbrunn; Erich Warmuth, Hofheim, both of Fed. Rep. of Germany

[73] Assignee: FAG Kugelfischer Georg Schafer (KGaA), Fed. Rep. of Germany

[21] Appl. No.: 300,327

[22] Filed: Jan. 23, 1989

[30] Foreign Application Priority Data

Mar. 3, 1988 [DE] Fed. Rep. of Germany ....... 3806928

[51] Int. Cl.⁴ .............................................. F16C 33/76
[52] U.S. Cl. ..................... 384/482; 277/37; 384/477; 384/484
[58] Field of Search ........................ 384/477, 481–486, 384/130, 137–153; 277/37

[56] References Cited

U.S. PATENT DOCUMENTS

| 4,448,426 | 5/1984 | Jackowski et al. | 277/37 |
| 4,448,461 | 5/1984 | Otto | 384/482 |
| 4,552,367 | 11/1985 | Fedorovich et al. | 277/37 X |
| 4,669,895 | 6/1987 | Colanzi et al. | 384/477 |

Primary Examiner—Thomas R. Hannon
Attorney, Agent, or Firm—Ostrolenk, Faber, Gerb & Soffen

[57] ABSTRACT

A seal, particularly for antifriction bearings, which includes two facing L-shaped, rigid sheet metal parts. The axially directed arm of each sealing part, has on its radially outer surface, a thin elastic covering layer which is scraped off over part of its axial length during assembly of the seal into the space between the bearing rings. The scraped off part of the covering is stored in a groove in the interior of the adjacent bearing ring. Two of the L-shaped parts are provided and their open sides face toward each other. Sealing lips seal the space between them.

9 Claims, 2 Drawing Sheets

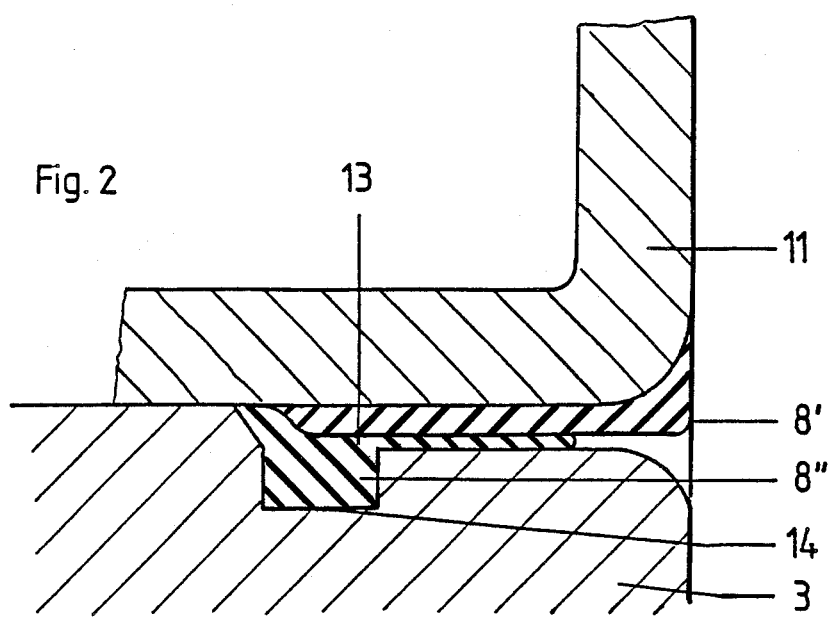
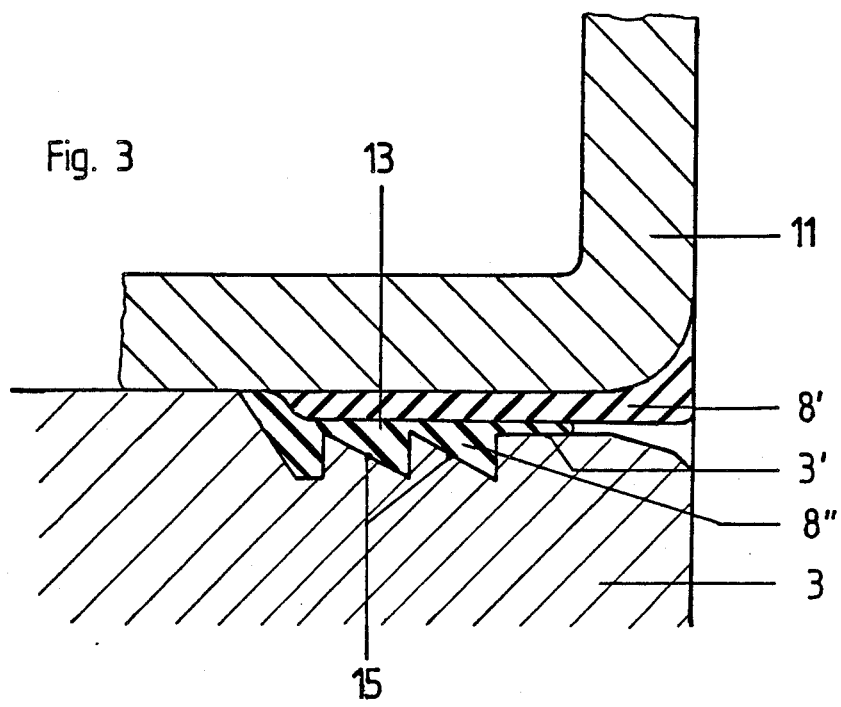

SEAL FOR ANTIFRICTION BEARINGS

BACKGROUND OF THE INVENTION

The present invention relates to a seal for an antifriction bearing, and more particularly to an elastic layer between a sealing part of the seal and the adjacent bearing ring.

Seals are known in which at least one sealing part comprises an L-shaped part fabricated of sheet metal and provided with an elastic lip. These metal seals were previously pressed directly into the receiving parts, e.g. into the bearing rings. The sheet metal parts are produced by plastic deformation. They are not very precise or of sufficiently flexible material. As a result, when they are in the seated position in the receiving part, e.g. the bearing ring, gaps are present which substantially reduce the sealing action.

This problem has been eliminated by applying an elastic layer over the entire width, or at least over a part of the width, of the sealing part in the external region of the sealing part which engages the bearing ring. This elastic layer compensates for inaccuracies and avoids leakage points in the region of the seat of the sealing part. These embodiments, however, have the disadvantage that in one type, in which an elastic layer of only small thickness is applied, the layer is completely stripped-off upon the pushing on of the sealing part onto the seat.

One solution is to apply a thicker elastic layer by vulcanizing it on. This is not disadvantageous for manufacturing if, for instance, the sealing lip is vulcanized onto the L-shaped sheet metal parts. However, the situation is unfavorable in the case of sealing parts which consist of sheet metal parts alone. They have to be further provided with a layer vulcanized in place, which is quite expensive.

SUMMARY OF THE INVENTION

It is the primary object of the present invention to avoid the above disadvantages and to coat the sheet metal sealing part such that expensive processes are not necessary while the sealing action is retained in its entirety.

The invention concerns a seal for use in an anti-friction bearing and also concerns a bearing which incorporates such a seal. The bearing, as is usual, comprises an inner ring, an outer ring around and spaced radially from the inner ring and a row of rolling elements, usually balls, rolling between the inner and the outer rings. The radial space defined between the inner and the outer rings is sealed at at least one axial side of the rolling elements by the seal in accordance with the invention.

The seal includes at least one sealing part that is generally L-shaped, including an axial arm that extends in the axial direction of the bearing and that engages the inner surface of one of the bearing rings, and also including a radial arm which extends radially from the axial arm into the space. On the radially outer surface of the axial arm of the sealing part, there is a thin covering layer of elastic material. The covering layer includes a strippable portion which is that portion of the covering layer that is on the portion of the axial arm that is first installed as the seal is moved axially into the sealable space and toward the rolling elements. That strippable portion of the covering layer is stripped off the axial arm and as a result moves over the unstripped portion of the covering layer, even making the remaining covering layer of double thickness. To accommodate the stripped off portion of the covering layer and also the remaining unstripped portion of that layer, there is a receiving region of the inner surface of the cooperating bearing ring, e.g. by the bearing having a cicumferential groove defined in it for receiving the stripped off material and the remainder of the unstripped covering layer and/or by the axial arm itself having a recess defined in it.

In the preferred form of the seal, there is second one of the L-shaped sealing parts having an axial arm with an elastic covering layer that cooperates with the inner surface of the other bearing ring, so that one axial arm is at the inner surface of the outer bearing ring while the other axial arm is at the inner surface of the inner bearing ring. The axial arm of the second sealing part also is provided with an elastic covering layer including a strippable portion which also is stripped off in the same way as in the first mentioned axial arm. The cooperating inner surface of the bearing ring has a cooperating groove for receiving the strippable material, as with the first mentioned axial arm.

The two L-shaped sealing parts are oriented so that their open sides face toward each other and their respective radial legs are axially spaced apart. Appropriate sealing means, such as sealing lips extend between the sealing parts and seal the space between them. Each of the sealing parts is attached to its respective bearing ring so that the sealing parts rotate with respect to each other. The sealing means, e.g. sealing lips, are attached to one of the sealing parts, contact the other sealing part and maintain the seal as the sealing parts rotate with their respective rings with respect to each other.

According to the invention, the L-shaped sheet metal parts can be simply provided with a thin elastic covering, e.g. by spraying on the elastic layer. Upon the assembly of this embodiment of a seating part onto its seat, this elastic layer is stripped off, as already occurs in prior art embodiments. However, this stripping off takes place only over the axial portion of the sealing part in which the sheet metal sealing part is directly engaged in the receiving part. In the preferred embodiment of a bearing, this axial portion is that portion nearer to the rolling elements. The stripping off ends in the region in which a groove or depression is present in one receiving part, i.e. in the seat for the seal and/or in the sheet metal part itself. The part of the elastic layer that is scraped off during installation accumulates in the axial region at the groove or depression. This effects just as good sealing of the sheet metal parts in the receiving parts as is obtained with the prior art, without however being so expensive.

In order that the elastic layer parts that have been scraped off are held better in the groove, the groove may have a depression toward its axially inner region. The same effect is also obtained by providing at least one cylindrical limiting surface of the groove with teeth.

Other objects and features of the present invention will become apparent from the following description of preferred embodiments of the invention considered in conjunction with the accompanying drawings.

BRIEF DESCRIPTION OF THE DRAWINGS

FIG. 2 is a larger, fragmentary view of a variant of the seal of FIG. 1.

FIG. 3 is a larger, fragmentary view of another variant of the seal of FIG. 1.

DESCRIPTION OF THE PREFERRED EMBODIMENTS

Figure 1:
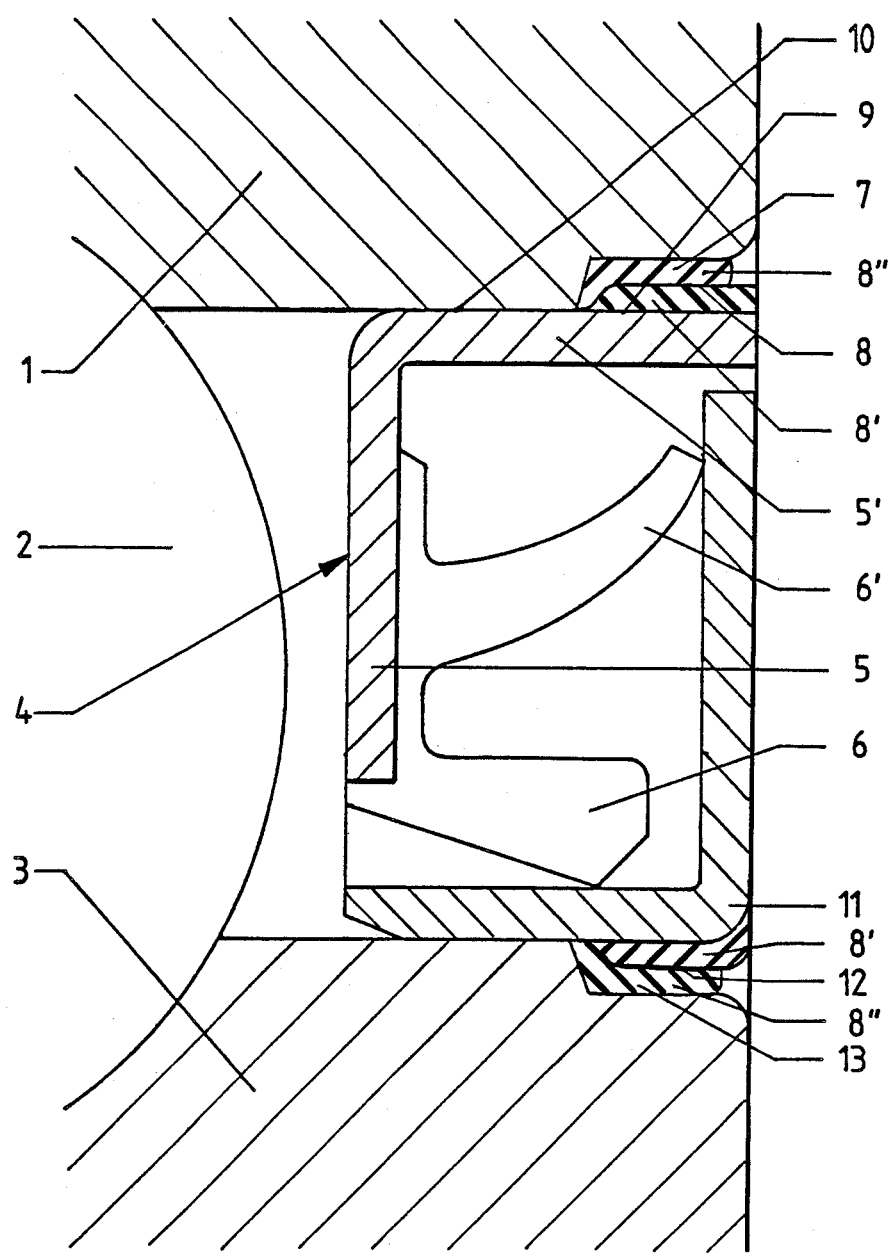
FIG. 1 is a partial cross-section through a ball bearing having a seal according to the invention.

FIG. 1 shows a ball bearing which comprises an outer ring 1, a row of rolling elements, here balls 2, and an inner ring 3. The rings 1 and 3 are movable relative to each other. The rings are radially spaced apart. A seal 4 according to the invention is arranged in the radial space between the relative movable rings toward one axial side of the rolling elements.

The seal 4 comprises a first L-shaped, rigid sheet metal part 5 having one axial arm 5' which is fastened to the bearing outer ring 1. On the other radially inwardly directed arm of the part 5 are fastened two elastic, radially separated, sealing lips 6, 6', each of which engages a respective leg of the below described second L-shaped metal part 11.

An annular groove 7, which is open axially outward of the outer ring, is formed on the radially inward bore surface of the outer ring and is provided at the place of the seat between the outer ring 1 and the axial arm 5' of the part 5 in the axially outer region of the outer ring 1. Within the groove 7, an elastic layer 8 is arranged to serve as a sealing medium. This elastic layer 8 is formed of a thin elastic covering 8' formed on the outer surface 9 of the axial arm 5' in the axial region of the groove 7, and is also formed of the elastic covering layer 8'' which has been scraped off the remaining axially more inward part 10 of the outer surface of arm 5'. Initially, the elastic covering layer may have extended over the entire axial width of the outer surface of the arm 5', or at least over an axial part of that arm that is greater in width than the width of groove 7. The insertion of the seal, and particularly of metal part 5, into the space between the bearing rings scrapes off the elastic covering layer part 8''. In this way, good sealing action is obtained in this region between the sheet metal part and the outer ring.

An equivalent embodiment is shown by the second L-shaped sheet metal part 11 of the seal 4, which is fastened in a corresponding manner to the bearing inner ring 3. Here, the thin covering on the axially outward part of the exterior surface of the axial arm and the scraped off part are stored as a sealing medium 12 in the groove 13. The sealing lip 6' from the L-shaped part 5 engages the interior of the radial arm of L-shaped part 11, while the sealing lip 6 from the L-shaped part 5 engages the interior of the axial arm of the part 11. These engagements seal against leakage past the free ends of the radial arms of the metal parts 5 and 11.

FIGS. 2 and 3 show special embodiments of the groove 7 or of the groove 13, respectively. In FIG. 2, the groove 13 is provided with a radial depression 14 in its axially inward region. In FIG. 3, the cylindrical limiting surface 3' of the groove 13 is provided with teeth 15. Each of these two measures assures better holding of the scraped-off layer 8'' within the groove 13. Other configurations for grooves 7 or 13 may be envisioned.

Although the space for receiving scraped-off layer 8'' has been shown as a groove in the respective bearing ring with which the L-shaped metal part cooperates, the L-shaped part may be recessed or depressed, at the axially outward region of its axial arm, to define the groove for layer 8'', or perhaps even both the bearing ring and the cooperating L-shaped part may be recessed to define that groove.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A seal for an antifriction bearing, wherein the bearing comprises an inner ring, an outer ring around and paced from the inner ring defining a radial space between the rings, a row of rolling elements between the inner and outer rings, and a seal in the radial space between the inner and outer rings; the seal comprising:

at least one sealing part generally of an L-shape including an axial arm adapted for extending in the axial direction of the bearing and a radial arm which extends radially from the axial arm toward the other bearing ring; the axial arm having a radially outer surface, a thin elastic covering layer applied on the radially outer surface of the axial arm of the L-shaped sealing part; the covering layer including a strippable part which is the part of the covering layer that is on the part of the axial arm that is first installed as the seal is moved axially into the space and toward the rolling elements, such that the strippable part of the covering layer may be stripped off the axial arm and moved over the unstripped part of the covering layer remaining on the axial arm upon installation of the L-shaped part in the space between the rings with the axial arm in engagement with a respective ring.

2. The seal of claim 1, further comprising a second generally L-shaped sealing part also including a second radial arm extending along the axis of the bearing and a second radial arm extending across the axis of the bearing, wherein the first mentioned axial arm of the first mentioned sealing part is disposed at one of the rings of the bearing while the second axial arm of the second sealing part is disposed at the other of the bearing rings; the L-shaped sealing parts are disposed to open toward each other, with the axial arm of one sealing part facing axially outwardly and the axial arm of the other sealing part facing axially inwardly, and sealing means disposed between the spaced apart first and second sealing parts for sealing the space between them.

3. The seal of claim 2, wherein the second axial arm of the second sealing part includes a second outer surface with a second covering layer on the outer surface including a second strippable part which is a part of the second covering layer that is on the part of the second axial arm that is first installed as the seal is moved axially into the space and toward the rolling elements, such that the second strippable part of the second covering layer may be stripped off the second axial arm and moved over the unstripped part of the second covering layer remaining on the second axial arm upon installation of the second sealing part in the space between the rings with the second axial arm in engagement with a respective bearing ring.

4. An antifriction bearing including a seal, wherein the bearing comprises an outer bearing ring, an inner bearing ring radially inward of the outer bearing ring and spaced therefrom; the bearing rings having inner surfaces facing each other for defining a sealable radial space therebetween, and a row of rolling elements disposed between the inner surfaces of the outer and inner rings;

a seal in the space at an axial side of the rolling elements for sealing the space between the outer and inner rings, the seal comprising:

an L-shaped sealing part having an axial arm extending along the axial direction of the bearing, the axial arm having a radially outer surface disposed at the inner surface of one of the outer and inner rings;

a thin elastic covering layer disposed on the outer surface of the axial arm and facing the inner surface of the one bearing ring; the axial arm and the inner surface of the one ring facing into the space being respectively so shaped that as the axial arm is inserted into the space in the direction toward the rolling elements, the portion of the elastic covering layer that is on the axial arm outer surface nearer the rolling elements is stripped off, through engagement, of the elastic covering layer with the inner surface of the one bearing ring, for being shifted toward the remainder of the elastic covering layer on the outer surface of the axial arm, the one ring of the bearing including a receiving part on the inner surface thereof for receiving a stripped off portion of the elastic covering layer on the axial arm of the sealing part for completing the seal between the axial arm of the sealing part and the inner surface of the one bearing ring; and the sealing part also having a radial arm which extends radially into the space from the axial arm toward the other bearing ring.

5. The bearing of claim 4, wherein the receiving part at the inner surface of the one bearing ring for receiving the stripped off portion of the elastic covering layer comprises a circumferential groove defined in the inner surface of the one ring located toward the axial outside region of the sealing part.

6. The bearing of claim 4, the seal further comprising a second generally L-shaped sealing part also including a second axial arm extending along the axial direction of the bearing, the second axial arm having a second outer surface disposed at the inner surface of the second one of the bearing rings;

a second seal in the space at the same axial side of the second rolling elements for sealing the space between the outer and inner rings, a second thin elastic covering layer disposed on the second outer surface of the second axial arm facing the inner surface of the second bearing ring; the second axial arm and the inner surface of the second ring facing into the space being respectively so shaped that as the second axial arm is inserted into the space in the direction toward the second rolling elements, the portion of the second elastic covering layer that is on the second axial arm surface nearer the second rolling elements is stripped off through engagement of the second elastic covering layer with the inner surface of the second ring for being shifted toward the remainder of the second elastic covering layer on the second outer surface of the second axial arm, the second ring of the bearing including a receiving part n the inner surface thereof for receiving a stripped off portion of the second elastic covering layer on the second axial arm of the second sealing part for completing the seal between the second axial arm of the sealing ring and the inner surface of the second bearing ring;

the second sealing part also having a second radial arm which extends radially into the space from the second axial arm toward the other bearing ring;

the L-shaped sealing parts are disposed open facing toward each other with the radial arm of one sealing part being axially outward and the radial arm of the other sealing part being axially inward, and sealing means disposed between the spaced apart first and second sealing parts for sealing the space between them.

7. The bearing of claim 6, wherein the receiving part at the inner surface of the one bearing ring for receiving the stripped off portion of the elastic covering layer comprises a circumferential groove defined in the inner surface of the one ring located toward the axial outside region of the sealing part.

8. The bearing of claim 7, wherein at least one of the circumferential grooves includes a radially deeper recess axially inward from the axial outer end of the groove.

9. The bearing of claim 6, wherein at least one of the circumferential grooves is shaped to define at least one tooth, which receives and engages the stripped off portion of the elastic covering layer.

* * * * *